United States Patent [19]

Takagi et al.

[11] 3,846,644

[45] Nov. 5, 1974

[54] INTERMITTENTLY DRIVING CIRCUIT FOR A LOAD SUCH AS A BUZZER OR A BELL

[75] Inventors: Shigeyuki Takagi, Nishikasugai-gun; Isamu Kawashima, Chita-gun; Katsuyuki Takagi, Gifu; Sohei Hibino, Nagoya, all of Japan

[73] Assignee: Kabushiki Kaisha Tokai Rika Denki Seisakusho, Nishikasugai-gun, Aichi Pref., Japan

[22] Filed: July 2, 1973

[21] Appl. No.: 375,593

Related U.S. Application Data

[62] Division of Ser. No. 206,362, Dec. 9, 1971, abandoned.

[30] Foreign Application Priority Data

Dec. 11, 1970 Japan .............................. 45-109349

[52] U.S. Cl. ............... 307/252 J, 307/246, 307/293, 331/111

[51] Int. Cl.. H03k 17/72, H03k 17/26, H03k 17/04

[58] Field of Search ........ 307/252 J, 252 H, 252 W, 307/246, 284, 293, 294, 305; 323/36; 317/141 S; 331/111

[56] References Cited

UNITED STATES PATENTS

| | | | |
|---|---|---|---|
| 3,222,548 | 12/1965 | Sanford | 307/305 X |
| 3,238,418 | 3/1966 | Heft | 307/252 M X |
| 3,300,622 | 1/1967 | Swain | 307/252 W X |
| 3,411,507 | 11/1968 | Wingrove | 331/111 |
| 3,493,790 | 2/1970 | Lundin | 307/293 |
| 3,593,197 | 7/1971 | Carreras | 331/111 |

FOREIGN PATENTS OR APPLICATIONS

| | | | |
|---|---|---|---|
| 4,323,817 | 1968 | Japan | 307/252 J |
| 4,616,461 | 1971 | Japan | 307/252 W |

OTHER PUBLICATIONS

Solid State Products, Inc., Bulletin D420-02-12-59; pages 13-16, 12/59.

Ridenour & Turco, "Unijunction Control Spacing Between Pulses," Electronics (Pub.), p. 82-83, 7/11/1966.

Cope & Ferrall, "DC-Bootstrapped UJT Circuit has Linear, Variable Output," Electronic Design (Pub.) p. 68; 8/30/1966.

Grafham, "PNPN Switches with Gate Turn-Off Control," G. E. Application Note 200.23; 5/1962; pages 6-7.

Lloyd et al., "A Single SCR Controls Battery-Operated Buzzer," Electronics Design, Vol. 16, page 114, 6/6/1968.

Klose, "Bounce Eliminating Circuit," IBM Tech. Discl. Bull.; Vol. 14, No. 3, p. 995, 8/1971.

G.E. SCR Manual, 4th Edition, pages 163-164; 3/1967.

*Primary Examiner*—Rudolph V. Rolinec
*Assistant Examiner*—L. N. Anagnos
*Attorney, Agent, or Firm*—Woodhams, Blanchard & Flynn

[57] ABSTRACT

An intermittently driving circuit for a load such as a buzzer or a bell which by itself interrupts a current flowing therethrough. An SCR is connected in series with the load and a charge-and-discharge circuit including a capacitor is connected between a gate and a cathode of the SCR. The SCR is turned on after a charging period of the charge-and-discharge circuit for driving the load, while it is turned off after a discharging period of the charge-and-discharge circuit by the current interrupting operation of the load to stop driving of the load.

3 Claims, 6 Drawing Figures

*INVENTORS*
SHIGEYUKI TAKAGI
ISAMU KAWASHIMA
KATSUYUKI TAKAGI
SOHEI HIBINO

*BY*
WOODHAMS, BLANCHARD and FLYNN
*ATTORNEY*

*INVENTORS*
SHIGEYUKI TAKAGI
ISAMU KAWASHIMA
KATSUYUKI TAKAGI
SOHEI HIBINO

*BY*
WOODHAMS, BLANCHARD and FLYNN
*ATTORNEY*

INTERMITTENTLY DRIVING CIRCUIT FOR A LOAD SUCH AS A BUZZER OR A BELL

CROSS-REFERENCE TO RELATED APPLICATION

This application is a divisional of our copending application Ser. No. 206,362, filed Dec. 9, 1971, and now abandoned, and entitled "Intermittently Driving Circuit for a Load Such as a Buzzer or Bell."

The present invention relates to an intermittently driving circuit for a load, particularly a noise-making load such as a buzzer which interrupts a current therethrough by itself.

There has been provided a driving circuit for intermittently driving a buzzer which by itself interrupts a current therethrough to produce vibrating sound for alarm, for example a buzzer mounted on a rear portion of a truck or a lorry for giving an alarm when the truck or the lorry is to be backed. Such a driving circuit usually includes an electronic circuit such as a flip-flop circuit or a unit which is similar to a conventional flasher unit of heat wire type commonly used in an on-off signal generator for direction indicator of an automobile, by which driving circuit, a buzzer may be intermittently driven. Such a construction, however, is rather complex in structure, difficult to assemble and rather expensive to manufacture.

The present invention is intended to overcome the above-mentioned difficulties and it is an object of the present invention to provide an intermittently driving circuit for a load such as a buzzer, which circuit enables an SCR, which is generally considered to be difficult to be turned off with a d.c. power supply, to be turned off by making use of a current interrupting operation of the buzzer. Thus, the load or the buzzer can be intermittently driven by connecting the buzzer in series with the SCR, rendering the circuit configuration simpler, the construction easier and the cost lowered.

In accordance with the present invention, there is provided an intermittently driving circuit for a load which by itself interrupts a current flowing therethrough, comprising an SCR connected in series with said load; a charge-and-discharge circuit including a capacitor connected between a gate and a cathode of the SCR; said SCR being turned on after a charging period of said charge-and-discharge circuit to drive the load and said SCR being turned off after a discharging period of the charge-and-discharge circuit by utilizing a current interrupting operation of the load to stop driving the load.

The invention will be better understood from the following description taken in connection with the accompanying drawings in which.

In the drawings and the following descriptions, like portions or parts are denoted by like numerals or characters.

Figure 1:
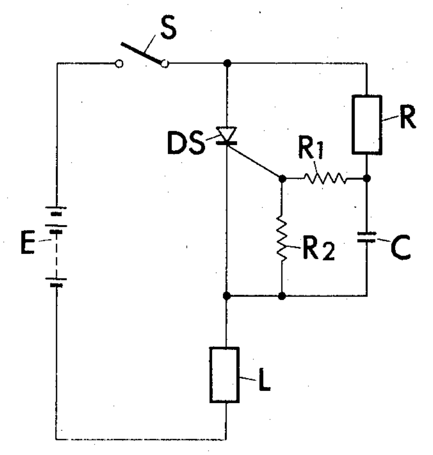
FIG. 1 shows a circuit diagram embodying the present invention, wherein a load is connected between an SCR and a negative terminal of a power supply.

One embodiment of the present invention will now be described with reference to FIG. 1 in which reference character E represents a D.C. power supply such as a battery mounted on a car or the like. S represents a switch having one terminal connected to a positive terminal of the power supply E, and another terminal connected to an anode of an SCR designated by character DS. A cathode of the SCR is connected to a negative terminal of the power supply through a load L which intermittently interrupts a current flowing therethrough. Character R represents a charge-and-discharge resistor. One terminal of said charge-and-discharge resistor R is connected to said another terminal of the switch S and the other terminal of the resistor R is connected to a capacitor C. A charge-and-discharge circuit is composed of the resistor R and the capacitor C. Said capacitor C is further connected to a cathode of the SCR DS. A resistor $R_1$ is connected between a junction of the charge-nad-discharge resistor R and the capacitor C, and a gate of the SCR DS. A resistor or thermistor $R_2$ is connected between the gate and the cathode of the SCR DS to stabilize the circuit operation and effect temperature compensation.

The operation of the circuit thus constructed is now described. Upon closing the switch S, a charging current flows through the charge-and-discharge resistor R, the capacitor C and the load L and it begins to charge the capacitor C gradually. At the same time, a gate current flows to the gate of the SCR DS through the resistor $R_1$, but the gate current at this moment is too small to turn on the SCR DS. As the capacitor C is gradually charged up, the gate current increases until it reaches the minimum gate current required to turn on the SCR DS, whereupon the SCR DS is turned on. Since the load L is thus connected to the power supply E through the cathode-anode circuit of the SCR DS and the switch S, the load L is now energized and driven.

As the SCR DS is turned on, the potential at the cathode thereof is raised substantially to the supply voltage. The charge previously stored in the capacitor C is then supplied to the anode of the SCR DS through the charge-and-discharge resistor R. When the discharging current drops below a holding current of the SCR DS (the minimum anode current required to turn off the SCR DS) and when the current from the power supply E is interrupted by the load L, the SCR DS is turned off. Thus, the feeding to the load L is blocked and the driving of the load is stopped.

The capacitor C is then recharged to turn on the SCR DS after a predetermined time period to drive the load L. This cycle is repeated to drive the load L intermittently.

Figure 2:
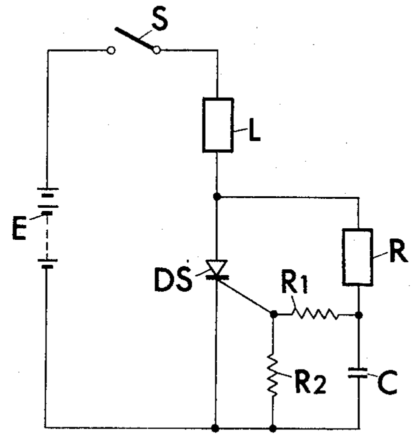
FIG. 2 shows a modified circuit diagram of FIG. 1, wherein the load is connected between the SCR and a positive terminal of the power supply.

FIG. 2 shows another embodiment of the present invention similar to the embodiment of FIG. 1 except that the load L is connected between the anode of the SCR DS and the switch S instead of being connected between the cathode of the SCR DS and the negative terminal of the power supply E. The circuit of FIG. 2, therefore, operates in the same manner as in the circuit of FIG. 1.

Figure 3:
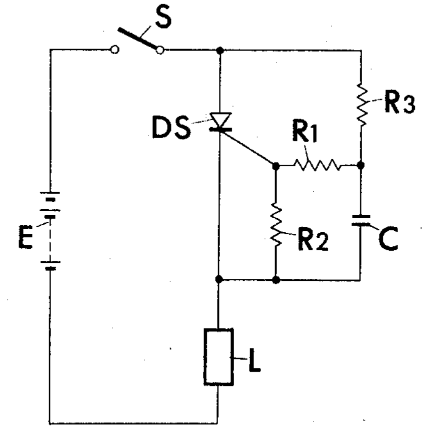
FIGS. 3 to 6 show other modified circuit diagrams of FIG. 1.

Another modified form of the circuit shown in FIG. 1 is illustrated in FIG. 3, which differs from the circuit of FIG. 1 in that a resistor $R_3$ is connected in place of the charge-and-discharge resistor R but the operation of the circuit is similar to that of FIG. 1. Since the charge-and-discharge of the condenser C is effected through the resistor $R_3$, the time interval of driving and non-driving of the load L may be adjusted by varying the value of the resistor $R_3$. In this circuit, however, it is rather difficult to determine a driving period and non-driving period of the load to be any desired value. A circuit of FIG. 4 enables the adjustment of these periods to be effected readily.

Figure 4:
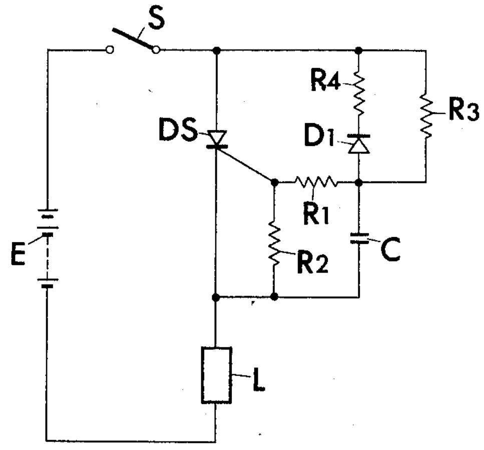

In the circuit of FIG. 4, a resistor $R_4$ and a diode $D_1$ connected in series are connected in parallel with the resistor $R_3$, which forms a discharge circuit. The diode $D_1$ is disposed in the circuit so that the anode thereof may be connected to the capacitor C. The operation of this circuit is now described. Upon closing the switch S, a current flows through the resistor $R_3$, the capacitor C and the load L, and the capacitor C is charged according to a time constant determined by the capacitor C and the resistor $R_3$. As the charge of the capacitor C increases and the gate current becomes a trigger gate current, the SCR DS is turned on to drive the load L. The turning-on of the SCR DS causes the charge stored in the capacitor to begin to discharge. A discharging current flows through the resistors $R_3$ and $R_4$ because the diode $D_1$ is forwardly biased at this time. When the discharging current drops below the holding current of the SCR DS and when the current to the load L is blocked, the SCR DS is turned off and the feeding to the load L is blocked. The above-mentioned operation will be repeated. By varying the resistances of the resistors $R_3$ and $R_4$, the charge-and-discharge period may be changed so that the driving and non-driving time intervals for the load L may be adjusted. All of the four circuits described hereinabove begin to drive the load L a predetermined time period after the respective switches S have been closed, while a circuit shown in FIG. 5 is adapted to drive the load L immediately after a switch S has been closed.

Figure 5:
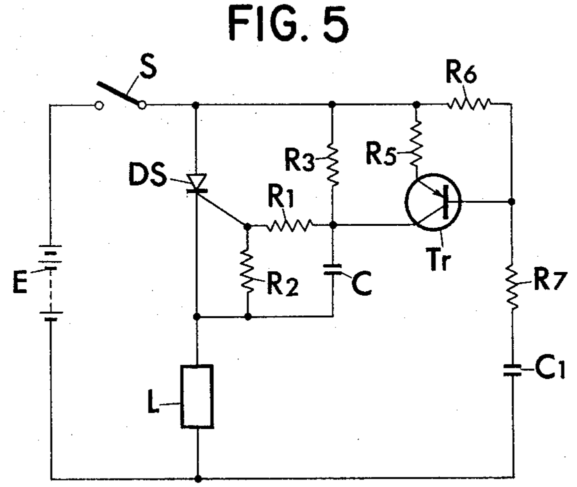

In FIG. 5, a collector of a transistor $Tr$ is connected to the junction of the resistor $R_3$ and the capacitor C shown in FIG. 3, an emitter of the transistor $Tr$ is connected to a terminal of the switch S remote from a power supply through a resistor $R_5$, and resistor $R_6$ is connected between said terminal of the switch S and a base of the transistor $Tr$. The base of said transistor $Tr$ is in turn connected to the negative terminal of the power supply E through a resistor $R_7$ and a capacitor $C_1$ connected in series.

The operation of the circuit shown in FIG. 5 is now described. Upon closing the switch S, a current flows through the resistor $R_5$, the transistor $Tr$, the resistor $R_7$ and the capacitor $C_1$ so that the transistor $Tr$ is turned on to flow a charging current through the resistor $R_5$, the transistor $Tr$, the capacitor C and the load L. In case the resistance of the resistor $R_5$ is determined to be considerably smaller than that of the resistor $R_3$, the capacitor C is instantaneously charged by the current flowing through the resistor $R_5$ and the transistor $Tr$ and at the same time a trigger gate current flows into the gate of the SCR DS through the resistor $R_1$ so that the SCR DS is turned on immediately after the switch S has been closed to drive the load L. The charge stored in the capacitor C is then discharged through the transistor $Tr$ and the resistor $R_3$ and the resistor $R_6$ and a current is supplied to the anode of the SCR DS. When the anode current drops below the holding current and when the current from the power supply E which is connected or disconnected by the load L is blocked, the SCR DS is turned off. Thus, the driving of the load L is stopped.

As the SCR DS is turned off, the capacitor C begins to be charged again. In this case, however, unlike the above operation, the capacitor is not charged through the transistor $Tr$ but charged by a current flowing through the resistor $R_3$. The capacitor $C_1$ was previously fully charged by the base current flowing after the closure of the switch S and the current supplied through the resistor $R_6$. No charging current flows thereafter. Thus the base current does not flow and the transistor $Tr$ maintains its off condition. Accordingly, the capacitor C is charged by the current flowing through the resistor $R_3$. At the same time, the gate current flows through the resistor $R_1$ but the SCR DS is not turned on until the capacitor C is fully charged and the gate current reaches to the trigger current. After a predetermined time period, when the trigger gate current flows into the gate, the SCR DS is turned on to drive the load L. Also, as the SCR DS is turned on, the charge stored in the capacitor C is discharged to supply through the resistor $R_3$, the transistor $Tr$ and the resistor $R_6$ to the anode of the SCR DS. When this current drops below the holding current and when the current is blocked by the load L, the SCR DS is turned off and the capacitor C again begins to be charged. The operation as mentioned above is repeated to intermittently drive the load L. Thus, the transistor $Tr$ is turned on only when the switch S is closed to rapidly charge the capacitor C through the resistor $R_5$ having a resistance value sufficiently smaller than that of the resistor $R_3$. Thus, the SCR DS is turned on rapidly and the load L is driven instantaneously after the closure of the switch S. The transistor $Tr$ thereafter maintains its off condition.

With the embodiments shown in FIGS. 1 through 5, the driving period of the load varies with the variation of the supply voltage. This is overcome by an embodiment shown in FIG. 6.

Figure 6:
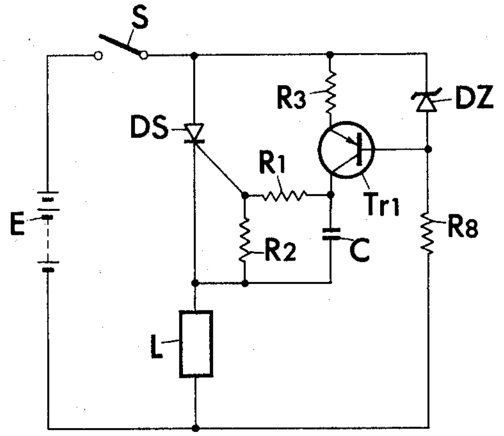

In FIG. 6, an emitter and a collector of a transistor $Tr_1$ are connected between the charge-and-discharge resistor $R_3$ and the capacitor C of the circuit of FIG. 3 and a zener diode DZ is connected between a base of the transistor $Tr_1$ and the terminal of the switch S remote from a power source. There is further connected a resistor $R_8$ between the base of the transistor $Tr_1$ and the negative terminal of the power supply E.

The operation of the circuit of FIG. 6 is as follows. Upon closing the switch S, a base current of the transistor $Tr_1$ flows through the resistor $R_3$, the transistor $Tr_1$ and the resistor $R_8$ to turn on the transistor $Tr_1$. At the same time, a current flows through the zener diode DZ and the resistor $R_8$ to maintain the voltage across the zener diode DZ at a constant value (zener voltage). Thus, the voltage across the resistor $R_3$ is maintained at a constant voltage which is substantially the zener voltage. On the other hand, when the transistor $Tr_1$ is turned on, the capacitor C is charged through the resistor $R_3$. The charging current is always constant because the capacitor C is charged through the resistor $R_3$ across which the constant voltage is maintained. The capacitor C is thus always charged by a constant current so that the charging period of the SCR DS is always maintained to be constant. As the SCR DS is turned on, the charge stored in the capacitor is supplied as an anode current of the SCR DS through the transistor $Tr$ and the zener diode DZ. When the anode current drops below the holding current, the SCR DS is turned off. The time period for supplying the anode current (the turn-off period of the SCR DS) is constant independently of the supply voltage.

Since both the turn-off period and the turn-on period of the SCR DS are maintained constant, the driving period of the load L is also maintained constant without being affected by the variation of the supply voltage.

As described above, according to the present invention, the load such as a buzzer or a bell which by itself interrupts a current flowing therethrough is connected in series with the SCR and the charge-and-discharge circuit is connected between the gate and the cathode of the SCR so that the SCR is turned on at a predetermined time interval and when the discharge of the charge-and-discharge circuit proceeds through the SCR turned on until the anode current drops below the holding current and when the current from the power supply which is connected or disconnected by the load is interrupted, the SCR is turned off to stop driving the load. Thus, the load can be intermittently driven by a simple circuit which can be manufactured, readily at a reasonable cost.

What is claimed is:

1. An intermittent driving circuit, comprising in combination: an SCR having a gate;

a capacitor and coupling means connecting said capacitor to said gate;

a voltage source, a switch and a first resistor;

means defining a first loop connecting in series said voltage source, switch, first resistor and capacitor and responsive to closure of said switch for charging said capacitor to a level sufficient to fire said SCR;

means defining a second loop connecting in series said SCR, said voltage source and said switch for supplying sufficient SCR anode current to maintain SCR conduction when said second loop is closed;

a self interrupting load and means connecting same in series in said first and second loops for interrupting current flow through said second loop after energization by SCR current flow in said second loop;

means defining a third loop omitting said self interrupting load and connecting in series said SCR, said capacitor and at least said first resistor for discharging said capacitor through at least said first resistor to the anode of said SCR over a first time period independent of SCR conduction through said self interrupting load and for thereafter turning off said SCR upon simultaneous occurrence of capacitor discharge current less than the anode holding current of said SCR and a current interruption by said self interrupting load;

a transistor having collector and emitter electrodes connected between said capacitor and the anode of said SCR and a base bias circuit for said transistor connected across said series SCR and self interrupting load, said transistor having a base electrode connected intermediate the ends of said bias circuit, the collector and emitter terminals of said transistor being coupled in series with a second resistor across said first resistor, said base bias circuit including a resistive voltage divider and a further capacitor in series, whereby upon closure of said switch said transistor rapidly charges said first mentioned capacitor so as to substantially immediately cause said SCR to drive said self interrupting load but wherein said transistor is nonconductive for subsequent energizations of said self interrupting load by said SCR.

2. A circuit as claimed in claim 1, in which said coupling means comprises a further resistor and including an additional resistor connected in series with said further resistor across said capacitor.

3. A circuit as claimed in claim 1, in which said voltage divider comprises third and fourth resistors in series, said third resistor being connected between said second resistor and said transistor base, said second resistor being substantially smaller in value than said first resistor.

* * * * *